United States Patent [19]
Tan et al.

[11] Patent Number: 6,114,498
[45] Date of Patent: Sep. 5, 2000

[54] BENZOBISAZOLE POLYMERS CONTAINING 2,2'-BIPYRIDINE-5,5'-DIYL MOIETIES

[75] Inventors: Loon-Seng Tan, Centerville; Jerald L. Burkett, Troy, both of Ohio

[73] Assignee: The United States of America as represented by the Secretary of the Air Force, Washington, D.C.

[21] Appl. No.: 09/264,334

[22] Filed: Mar. 9, 1999

[51] Int. Cl.[7] .................................................. C08G 73/06
[52] U.S. Cl. .......................... 528/423; 528/422; 528/337; 528/485; 528/486
[58] Field of Search .................................. 528/423, 422, 528/337, 485, 486

[56] References Cited

U.S. PATENT DOCUMENTS

| | | |
|---|---|---|
| 5,521,277 | 5/1996 | Tan et al. . |
| 5,534,613 | 7/1996 | Tan et al. . |
| 5,536,866 | 7/1996 | Tan et al. . |
| 5,633,337 | 5/1997 | Tan et al. . |
| 5,770,121 | 6/1998 | Wang et al. . |

OTHER PUBLICATIONS

Chem Abstract: 130: 168731 "New aromatic benzazole polymers" Tan et al. 129: 203,332"Synthesis and characterization of Poly (benzo–bisoxazole)s and Poly (benzobisthiazole)s with 2,2'–Bipyridyl units in the backbone" "Yu et al.".
A.H. Gerber, Thermally Stable Polymers Derived from 2,3,5,6–Tetraaminopyridine, Journal of Polymer Science, Polymer Chemistry Edition, vol. 11, 1703–1719 (1973, no month given).

*Primary Examiner*—Duc Truong
*Attorney, Agent, or Firm*—Charles E. Bricker; Thomas L. Kundert

[57] ABSTRACT

An at least semiconductive polymer film is provided by infiltrating novel rigid-rod heterocyclic polymer film containing a 2,2'-bipyridine-5,5'-diyl moiety, with a conductive metal salt. These polymers have repeating units of the formula

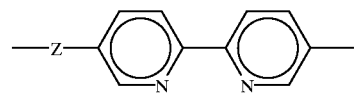

wherein Z is selected from the group consisting of

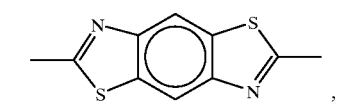

,

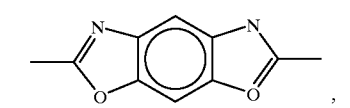

,

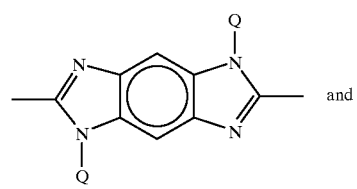

and

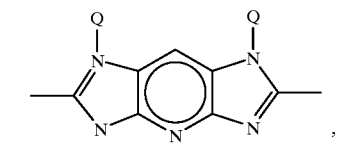

, wherein Q is —H or —$C_6H_5$. Alternatively, the metal salt in the semiconductive polymer film can be reduced.

28 Claims, No Drawings

BENZOBISAZOLE POLYMERS CONTAINING 2,2'-BIPYRIDINE-5,5'-DIYL MOIETIES

RIGHTS OF THE GOVERNMENT

The invention described herein may be manufactured and used by or for the Government of the United States for all governmental purposes without the payment of any royalty.

BACKGROUND OF THE INVENTION

The present invention relates to rigid-rod heterocyclic polymers.

Rigid-rod poly(benzobisazole) (PBX) polymers are well-known for their superior mechanical properties and high-temperature capability which are better than the state-of-the-art Aramids (e.g. Kevlar). The PBZ group includes poly(benzobisthiazole) (PBZT), poly(benzobisoxazole) (PBO) and poly(benzobisimidazole) (PBI) polymers and copolymers. These polymers and copolymers have been heralded as the next-generation structural materials.

It is known that isotropic and biaxially oriented PBZT films can be rendered electrically conductive via $^{84}Kr^+$ ion implantation. Conductivity as high as 100 S/cm for biaxially oriented film has been achieved. It is also known that PBZT film can be reduced electrochemically to a conductivity of about 20±10 S/cm. This is in accord with the fact that PBZ is known to be a π-deficient aromatic system as evidenced by both chemical and spectroscopic studies. Certain derivitized PBZT polymers have also exhibited $\chi^{(3)}$ non-linear optical (NLO) properties and ionic conductivity.

It is also known that PBZT polymer and copolymer films activated with iodine have exhibited increased conductivity. Tan et al, U.S. Pat. No. 5,521,277, issued May 28, 1996, disclose benzobisazole copolymers containing triarylamino moieties which can be doped with iodine to provide increased conductivity. Tan et al, U.S. Pat. No. 5,534,613, issued Jul. 9, 1996, disclose benzobisazole polymers containing triarylamino moieties which can be doped with iodine to provide increased conductivity. Tan et al, U.S. Pat. No. 5,633,337, issued May 27, 1997, disclose benzobisazole polymers and copolymers containing diphenylamino moieties which can be doped with iodine to provide increased conductivity.

It is an object of the present invention to provide novel rigid-rod heterocyclic polymers.

It is another object of the present invention to provide an at least semiconductive polymer film.

Other objects, aspects and advantages of the present invention will be apparent to those skilled in the art from a reading of the following detailed disclosure of the invention.

SUMMARY OF THE INVENTION

In accordance with the present invention there are provided novel rigid-rod heterocyclic polymers containing a 2,2'-bipyridine-5,5'-diyl moiety. These polymers have repeating units of the formula

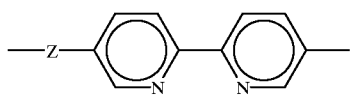

wherein Z is selected from the group consisting of

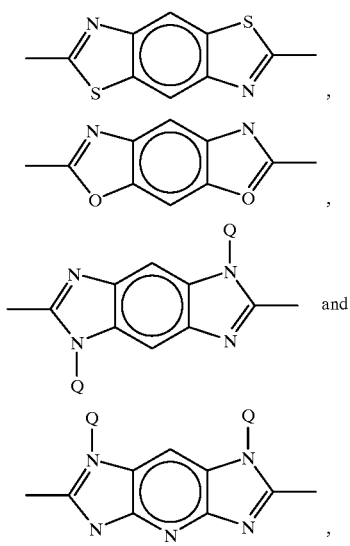

wherein Q is —H or —$C_6H_5$.

Also provided is a method to produce an at least semiconductive polymer film.

DETAILED DESCRIPTION OF THE INVENTION

The polymers of this invention are prepared by the polycondensation of a tetrafunctional monomer with 2,2'-bipyridine-5,5'-dicarbonyl dichloride. Briefly, the polymerization process comprises the following steps: (i) dehydrochlorination of the hydrochloride salt of the tetrafunctional monomer in the presence of the diacid chloride monomer in 77% PPA at 50–65° C.; (ii) addition of $P_2O_5$ to raise the $P_2O_5$ content of the medium to 83%; (iii) increasing the temperature to 140–180° C. to promote chain propagation and cyclodehydration; (iv) precipitation of the polymer into water and chopping it with a commercial-grade blender, followed by washing the polymer with ammonium hydroxide and with hot water (in a soxhlet extractor) and drying the polymer in vacuum at 100° C.

The tetrafunctional monomers diaminobenzenedithiol dihydrochloride (DABDT.2HCl), diaminobenzenediol dihydrochloride (DABDO.2HCl), tetraaminobenzene tetrahydrochloride (TAB.4HCl) and tetraaminopyridine trihydrochloride (TAP.3HCl) are known in the art. However, the latter may not be widely available. Accordingly, 2,3,5,6-tetraaminopyridine trihydrochloride (TAP.3HCl) can be prepared by dinitration of 2,6-diaminopyridine followed by catalytic reduction using a 5% palladium/charcoal catalyst. The free base 2,3,5,6-tetraaminopyridine (TAP) is unsatisfactory in the sense that it decomposes slowly at room temperature. However, the trihydrochloride salt can be obtained in a very high state of purity by treatment of the reduction mixture with methanolic concentrated HCl. The trihydrochloride salt (TAP.3HCl) can be stored under vacuum at room temperature for long periods.

The polymers of this invention are rendered electrically conductive by infiltrating thin films of the polymers with at least one conductive metal. Free-standing, thin-films (thickness ~25–1000 μm) of these polymers can be obtained via the method described in U.S. Pat. No. 5,770,121, Wang et al, issued Jun. 23, 1998, which is incorporated herein by reference. Briefly, the method comprises the steps of (a) preparing a solution of the polymer in a suitable solvent, (b) forming a film from the solution, (c) cooling the thus-formed film to a temperature below the freezing point of the solvent, and (d) dissolving the solvent out of the film at a temperature below the melting point of the solvent. Methane sulfonic acid (MSA) and polyphosphoric acid (PPA) are solvents for these polymers. Other suitable solvents include concentrated sulfuric acid, m-cresol, and the like, as well as Lewis acids such as nitromethane with aluminum chloride or nitrobenzene with gallium chloride. The thin film is formed by extrusion, doctor-blading or spin coating onto a suitable surface, such as glass or silicon wafer. The film solvent is dissolved out of the film using one or more non-solvents, so that the film solvent is removed without disrupting the molecular dispersion of the polymer. Suitable non-solvents include the lower alkyl alcohols, such as methanol, ethanol, propanol and the like, and lower alkyl ketones, such as acetone, methyl ethyl ketone and the like.

The resultant film is submerged in water or in the non-solvent until ready to be used in order to keep it in a swollen state. If a non-solvent is used, it is presently preferable to wash the film thoroughly with water to remove the non-solvent. The film is then infiltrated with at least one conductive metal by submerging the film in a solution of conductive metal salt. In the Examples which follow, we used an aqueous solution of silver nitrate, however the invention is not limited thereto. Other metals which may be used include copper, gold, platinum and the like. The film is submerged in the solution of conductive metal salt for a suitable time, which can vary from 5 minutes to 5 or more hours, depending on the concentration of the solution, the thickness and composition of the film, and the like.

The metal-infiltrated film may then be rinsed and dried, preferably under vacuum. This film can be used in electronic components where static charges need to be rapidly dissipated. Antistatic applications generally require semiconducting materials with a conductivity in the range of about $10^{-6}$ to $10^{-2}$ S/cm. Alternatively, the metal in the film may be reduced, using a suitable reducing agent, such as sodium borohydride, after which the reduced film is rinsed and dried. The thus-reduced film can be used for the fabrication of structural components which must exhibit multi-functional performance characteristics, particularly where both mechanical properties and electrical conductivity are important.

The following examples illustrate the invention:

EXAMPLE I 2,2'-Bipyridine-5,5'-dicarbonyl dichloride

Diethyl bipyridine-5,5'-dicarboxylate was prepared from catalytic dehydrogenative coupling reaction of ethyl nicotinate (Aldrich Chemical Co., 51.2 g.) in the presence of 10% Pd/C (Fluka, 15 g.) in a sealed tube at 135–140° C. for 4–7 days according to reported procedure. Subsequent recrystallization from isopropanol afforded the product as off-white needles. M.p. 148–149° C. Yield 12.1 g. (26%). Anal. Calcd for $C_{16}H_{16}N_2O_4$: C, 63.99; H, 5.37; N, 9.33. Found: C, 64.04; H, 5.16; N, 9.05.

Diethyl bipyridine-5,5'-dicarboxylic acid was isolated as a white powder from the saponification, using NaOH (3.65 g)/methanol (150 mL)/$H_2$ (200 mL), of the corresponding diethyl ester (7.00 g, 23.31 mmol.). M.p. 355–356° C. (dec.) Yield: 5.56 g. (97%). After drying in vacuum at 100° C., it was used without further purification in the subsequent reaction.

2,2'-Bipyridine-5,5'-dicarbonyl dichloride was prepared by refluxing the corresponding dicarboxylic acid (7.00 g., 28.66 mmol.) in excess thionyl chloride (200 mL) with 3 drops of dimethylformamide. The product was recrystallized from heptane (400 mL) as off-white needles. M.p. 216–217° C. Yield: 7.05 g. (88%). Anal. Calcd for $C_{12}H_6Cl_2N_2O_4$: C, 51.27; H, 2.15; Cl, 25.22; N, 9.33. Found: C, 51.17; H, 2.21; Cl, 24.97; N, 9.72.

EXAMPLE II

Poly(benzo(1,2-d:4,5-d')bisthiazole-2,6-diyl-2.2'-bipyridine-5,5'-diyl) (Bipy-PBZT)

Into a four-neck, 150 mL reaction flask were accurately weighed 2,2'-bipyridine-5,5'-dicarbonyl dichloride (2.4521 g, 10.000 mmol.), 2,5-diamino-1,4-benzenedithiol dihydrochloride (DABDT.2HCl, 2.8110 g, 10.000 mmol.) and polyphosphoric acid (PPA, 77%, 15.50 g). The reaction vessel was fitted with a mechanical stirrer, nitrogen inlet/outlet adapters and a glass stopper. The reaction mixture was initially flushed with nitrogen and then stirred under vacuum (using a water aspirator) for 2 hours at room temperature. The resultant light tan mixture was then heated to 87° C. under vacuum over a period of 4 h. During heating, it gradually became yellow-orange and almost clear. On completion of degassing, the mixture was cooled slightly under a slow stream of nitrogen and 10.13 g. of 99.9% phosphorus pentoxide ($P_2O_5$) was added to adjust the PPA concentration to 83%. The polymerization mixture was then heated to 180° C. over a period of 1 h. It became very viscous, silver-yellow, exhibiting stir-opalescence. The polymerization mixture was kept at this temperature for 17 h. The final silver-gold polymerization mixture, most of which clung on to the blades of the stirring rod, was immediately worked up with copious amount of water. The precipitated polymer was chopped in a high speed blender. The fibrous polymer was neutralized with $NH_4OH$, washed with boiling water (soxhlet extractor) for 16 h, filtered and dried under vacuum at 100° C. in the presence of $P_2O_5$ for 16 h. The yield of the polymer was quantitative. $[\eta]=8.20$ dL/g (methanesulfonic acid, 30° C.). Elemental Analysis: Calcd. for $(C_{18}H_8N_4S_2)_n$: C, 62.77; H, 2.34; N, 16.27; S, 18.62; Cl, 0.00. Found: C, 61.54; H, 2.34; N, 15.75; S, 17.19; Cl, 0.19.

EXAMPLE III

Poly(benzo(1,2-d:4,5-d')bisoxazole-2,6-diyl-2,2'-bipyridine-5,5'-diyl) (Bipy-PBO)

Into a four-neck, 150 mL reaction flask were accurately weighed, 2,2'-bipyridine-5,5'-dicarbonyl dichloride, (2.9845 g 14.000 mmol), 4,6-diamino-1,3-benzenediol dihydrochloride (DABDO.2HCl, 3.9356 g 14.000 mmol.) and PPA (77%, 15.42 g). The reaction vessel was fitted with a mechanical stirrer, nitrogen inlet/outlet adapters and a glass stopper. The light tan mixture was initially flushed with nitrogen and then stirred under vacuum (using a water aspirator, 600 mm Hg) for 19 hours between temperatures 22° C. and 30° C. and between 30° C. and 92° C. for 5 h. During heating, it gradually became yellow and almost clear. On completion of degassing, the mixture was cooled slightly under a slow stream of nitrogen and 10.82 g. of 99.9% phosphorus pentoxide ($P_2O_5$) was added to adjust the PPA concentration to 83%. The polymerization mixture was then heated to 178° C. over a period of 2.5 h. It became very viscous, orange-brown with silver-gold metallic luster, exhibiting stir-opalescence. The polymerization mixture was kept at this temperature for 1.5 h. The final polymerization mixture, which was reddish-brown with silver-gold metallic luster, and most of which clung on to the blades of the stirring rod, was immediately worked up with copious amount of water. The precipitated polymer was chopped in a high speed blender. The fibrous polymer was neutralized with NH$_4$OH, washed with boiling water in a soxhlet extractor for 16 h, filtered and dried under vacuum at 100° C. in the presence of P$_2$O$_5$ for 16 h. The yield of the polymer was quantitative. [η]=9.50 dL/g (methanesulfonic acid, 30° C.). Elemental Analysis: Calcd. for (C$_{18}$H$_8$N$_4$O$_2$)$_n$: C, 69.23; H, 2.58; N, 17.94. Found: C, 68.78; H, 2.57; N, 17.29.

EXAMPLE IV

Poly(pyridino(2,3-d:5,6-d')bisimidazole-2,6-diyl-2, 2'-bipyridine-5,5'-diyl) (Bipy-PyBI)

Into a four-neck, 150 mL reaction flask were accurately 2,2'-bipyridine-5,5'-dicarbonyl dichloride (3.9345 g., 14.000 mmol.), 2,3,5,6-tetraaminopyridine trihydrochloride (TAP.3HCl, 3.7319 g., 14.000 mmol.) and polyphosphoric acid (PPA, 77%, 20.36 g). The reaction vessel was fitted with a mechanical stirrer, nitrogen inlet/outlet adapters and a glass stopper. The light tan mixture was initially flushed with nitrogen and then stirred under vacuum (using a water aspirator, 600 mm Hg) for 17 hours at 22° C. and heated to 92° C. over a period of 6 h. During heating, it gradually became yellow and completely homogeneous and clear. On completion of degassing, the mixture was cooled slightly under a slow stream of nitrogen and 13.88. of 99.9% phosphorus pentoxide (P$_2$O$_5$) was added to adjust the PPA concentration to 83%. The polymerization mixture was then heated to 160° C. over a period of 2.5 h. It became very viscous, dark-red with green metallic luster (purple when shined with a flashlight), exhibiting stir-opalescence. The polymerization mixture was kept at this temperature for 1.5 h. The final polymerization mixture, which was reddish-brown with silver-gold metallic luster, and most of which clung on to the blades of the stirring rod, was immediately worked up with copious amount of water. The precipitated polymer was chopped in a high speed blender. The fibrous polymer was neutralized with NH$_4$OH, washed with boiling water in a soxhlet extractor for 16 h, filtered and dried under vacuum at 100° C. in the presence of P$_2$O$_5$ for 24 h. The yield of the polymer was quantitative. [η]=7.50 dL/g (methanesulfonic acid, 30° C.). Elemental Analysis:

| Calcd. For: | C | H | N | P |
|---|---|---|---|---|
| (C$_{17}$H$_9$N$_7$)$_n$: | 65.59% | 2.91% | 31.50% | 0.00% |
| (C$_{17}$H$_9$N$_7$·H$_2$O)$_n$: | 62.00% | 3.37% | 29.77% | |
| (C$_{17}$H$_9$N$_7$·2H$_2$O)$_n$: | 58.79% | 3.77% | 28.23% | |
| (C$_{17}$H$_9$N$_7$·3H$_2$O)$_n$: | 55.89% | 4.14% | 26.84% | |
| (C$_{17}$H$_9$N$_7$·4H$_2$O)$_n$: | 53.26% | 4.47% | 25.58% | |
| Found: | 55.20% | 3.76% | 25.82% | 0.069% |

The elemental result suggests that the Bipy-PyBI contains 2–4 water molecules per repeat unit.

EXAMPLE V

Poly(benzo(1,2-d:4,5-d')bisimidazole-2,6-diyl-2,2'-bipyridine-5,5'-diyl) (Bipy-PBI)

Into a four-neck, 150 ml reaction flask were accurately weighed 2,2'-bipyridine-5,5'-dicarbonyl dichloride (3.1247 g., 11.000 mmol.), 2,3,5,6-tetraaminobenzene tetrahydrochloride (TAB.4HCl, 2.8413 g., 11.000 mmol.) and polyphosphoric acid (PPA, 77%, 9.66 g). The reaction vessel was fitted with a mechanical stirrer, nitrogen inlet/outlet adapters and a glass stopper. The light brown mixture was initially flushed with nitrogen and then stirred under vacuum (using a water aspirator, 600 mm Hg) for 17 hours at 22° C. and heated to 92° C. over a period of 6 hours. During heating, it gradually became brown. On completion of degassing, the mixture was cooled slightly under a slow stream of nitrogen and 5.29 g. of 99.9% phosphorous pentoxide (P$_2$O$_5$) was added to adjust the PPA concentration to 83%, making a polymer concentration of 18%. The polymerization mixture was then heated to 160° C. over a period of 16 hours. It became very viscous, dark brown with yellow metallic luster exhibiting stir-opalescence. The polymerization mixture was kept at this temperature for 20 hours. The final polymerization mixture, which was reddish-brown with gold metallic luster, most of which clung onto the blades of the stirring rod, was immediately worked up with copious amounts of water. The precipitated polymer was chopped in a high speed blender. The fibrous polymer was neutralized with NH$_4$OH, washed with boiling water in a soxhlet extractor for 16 hours, filtered and dried under vacuum at 100° C. in the presence of P$_2$O$_5$ for 24 hours. The yield of the polymer was quantitative. [η]=6.25 dL/g (methanesulfonic acid, 30° C.).

EXAMPLE VI

Preparation of Electrically Conducting Films

Free-standing, thin-films (thickness ~35–80 μm) of Bipy-PBZT, Bipy-PBO and Bipy-PyBI were obtained from their respective 2 wt.-% MSA solutions via the low-temperature coagulation method described previously. The resultant films were submerged in water until ready to be used in order to keep them in swollen state. Two strips (about 0.7 cm×3 cm) were cut from a larger piece. One of the strips was blotted dry with a paper towel, followed by being sandwiched between two small pieces of paper towel and two glass slides. The whole set-up was then secured with 4 binder clips and placed in a vacuum oven evacuated at ~25 mm Hg at room temperature overnight. The other strip was submerged in a 50 wt-% silver nitrate aqueous solution for 30 min. (60 min for Bipy-PyBI). The silver salt-infiltrated film was dip-rinsed in about 400 mL of deionized water for 20 seconds. It was then blotted dry with paper towel followed by being sandwiched between two small pieces of paper towel and two glass slides. The whole set-up was then secured with 4 binder clips and placed in a vacuum oven evacuated at ~25 mm Hg at room temperature overnight. 4-Probe d.c. conductivity measurement was then performed on each of these films (Ag$^+$ column in the following table). After conductivity measurement, the silver salt infiltrated film was submerged in a freshly prepared 1 wt-% sodium borohydride aqueous solution for 15 min. at room temperature. The silver-white film strip was placed in about 600 mL of deionized water and agitated for 5–10 minutes. It was then blotted dry with paper towel followed by being sandwiched between two small pieces of paper towel and two glass slides. The whole set-up was then secured with 4 binder clips and placed in a vacuum oven evacuated at ~25 mm Hg at room temperature overnight The dry film was subsequently subjected to the 4-probe d.c. conductivity measurement (Ag$^0$ column in the following table). The results are shown in Table 1.

TABLE 1

Film conductivity data measured with 4-probe method.

| Polymer | Film color (pristine) | σ (S/cm) (pristine) | σ (Ag⁺) (S/cm) (Film color) | σ (Ag⁰) (S/cm) (Film color) |
|---|---|---|---|---|
| Bipy-PBZT | orange-brown with purple reflection | $10^{-8}$ | $7.56 \times 10^{-5}$ (dark brown) | 42 (silver-white) |
| Bipy-PBO | brown with purple-red reflection | $<10^{-10}$ | $3.5 \times 10^{-5}$ (dark red) | 27.2 (silver-white) |
| Bipy-PyBl | dark green | $10^{-10}$ | $4 \times 10^{-4}$ (metallic green) | 25.2 (silver-white) |

Various modifications may be made to the invention as described without departing from the spirit of the invention or the scope of the appended claims.

We claim:

1. A rigid-rod heterocyclic polymer having repeating units of the formula:

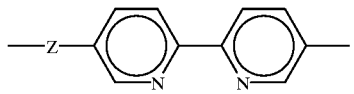

wherein Z is selected from the group consisting of

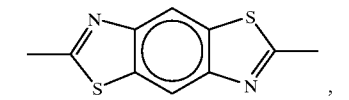

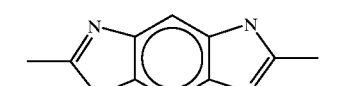

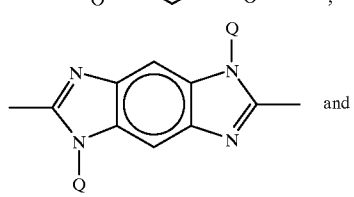

and

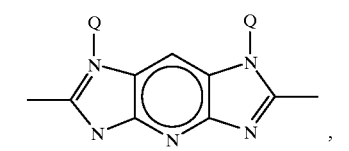

wherein Q is —H or —C₆H₅.

2. The polymer of claim 1 wherein Z is

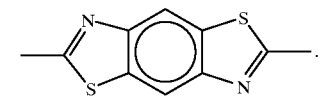

3. The polymer of claim 1 wherein Z is

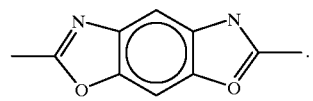

4. The polymer of claim 1 wherein Z is

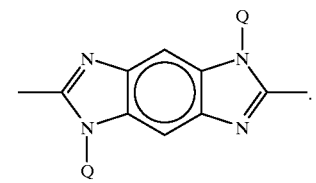

5. The polymer of claim 4 wherein Q is —H.
6. The polymer of claim 4 wherein Q is —C₆H₅.
7. The polymer of claim 1 wherein Z is

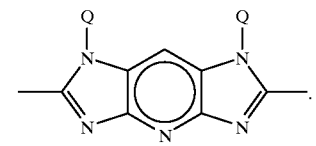

8. The polymer of claim 7 wherein Q is —H.
9. The polymer of claim 7 wherein Q is —C₆H₅.
10. A method for preparing an at least semiconductive polymer film which comprises the steps of
   (a) forming a rigid-rod heterocyclic polymer film, said polymer having repeating units of the formula:

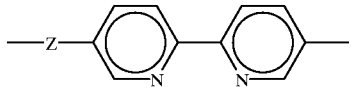

wherein Z is selected from the group consisting of

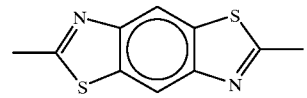

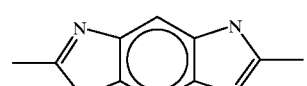

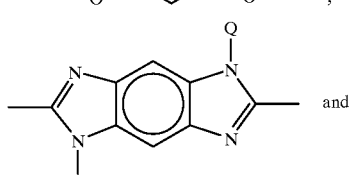

and

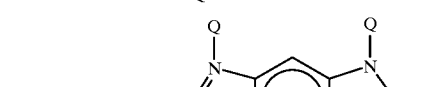

wherein Q is —H or —C₆H₅;

(b) impregnating the film from step (a) with a conductive metal salt; and (c) recovering the impregnated film from step (b).

11. The method of claim 10 wherein said conductive metal salt is silver nitrate.

12. The method of claim 11 wherein Z is

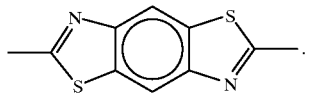

13. The method of claim 11 wherein Z is

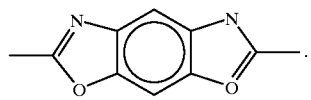

14. The method of claim 11 wherein Z is

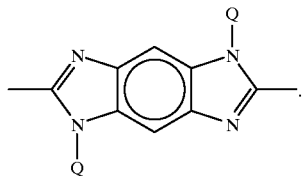

15. The method of claim 14 wherein Q is —H.
16. The method of claim 14 wherein Q is —$C_6H_5$.
17. The method of claim 11 wherein Z is

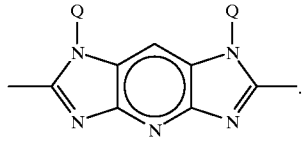

18. The method of claim 17 wherein Q is —H.
19. The method of claim 17 wherein Q is —$C_6H_5$.
20. The method of claim 10 further comprising the step of reducing the metal.

21. The method of claim 20 wherein Z is

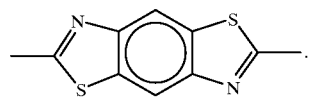

22. The method of claim 20 wherein Z is

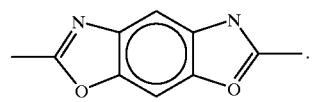

23. The method of claim 20 wherein Z is

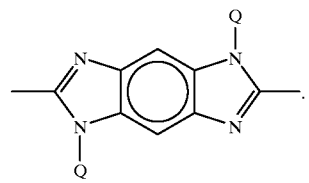

24. The method of claim 23 wherein Q is —H.
25. The method of claim 23 wherein Q is —$C_6H_5$.
26. The method of claim 20 wherein Z is

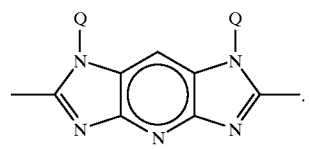

27. The method of claim 26 wherein Q is —H.
28. The method of claim 26 wherein Q is —$C_6H_5$.

* * * * *